United States Patent
Conway

(10) Patent No.: US 8,842,543 B2
(45) Date of Patent: *Sep. 23, 2014

(54) TRAP-FREE SHORTEST LINK-DISJOINT PATHS

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 418 days.

This patent is subject to a terminal disclaimer.

(21) Appl. No.: 13/029,337

(22) Filed: Feb. 17, 2011

(65) Prior Publication Data

US 2012/0213079 A1     Aug. 23, 2012

(51) Int. Cl.
*H04L 12/26* (2006.01)
*H04L 12/24* (2006.01)
*H04L 12/735* (2013.01)

(52) U.S. Cl.
CPC .............. *H04L 41/12* (2013.01); *H04L 45/128* (2013.01)
USPC ........................................................ 370/238

(58) Field of Classification Search
CPC .................................................. H04L 45/128
USPC .................. 370/216, 225, 228, 229, 235, 238; 709/238, 239, 242
See application file for complete search history.

(56) References Cited

U.S. PATENT DOCUMENTS

| | | | |
|---|---|---|---|
| 4,912,656 A * | 3/1990 | Cain et al. ..................... | 709/242 |
| 5,577,030 A | 11/1996 | Oki et al. | |
| 6,804,199 B1 | 10/2004 | Kelly et al. | |
| 6,996,065 B2 | 2/2006 | Kodialam et al. | |
| 7,352,703 B2 | 4/2008 | Elie-Dit-Cosaque et al. | |
| 7,397,761 B2 * | 7/2008 | Kar et al. ..................... | 370/225 |
| 7,451,340 B2 * | 11/2008 | Doshi et al. .................. | 714/47.2 |
| 7,643,408 B2 | 1/2010 | Atkinson et al. | |
| 7,701,848 B2 * | 4/2010 | Qiao et al. ..................... | 370/228 |
| 8,027,245 B2 * | 9/2011 | Kodialam et al. ............. | 370/216 |
| 8,135,026 B2 | 3/2012 | Khandekar | |
| 8,144,626 B2 | 3/2012 | Zhang et al. | |
| 8,223,651 B2 | 7/2012 | Kano | |
| 8,284,758 B2 | 10/2012 | Shah et al. | |
| 8,396,066 B1 | 3/2013 | Banerjee et al. | |
| 2003/0224796 A1 | 12/2003 | Landes et al. | |
| 2003/0227877 A1 | 12/2003 | Kar et al. | |
| 2005/0237950 A1 * | 10/2005 | Yuan et al. .................... | 370/255 |
| 2009/0245136 A1 | 10/2009 | Kano | |
| 2010/0329120 A1 | 12/2010 | Zhang et al. | |
| 2011/0080846 A1 | 4/2011 | He et al. | |
| 2012/0044811 A1 | 2/2012 | White et al. | |

OTHER PUBLICATIONS

Wang, Yan et al. (2009 Publication; New SRLG-diverse path selection algorithm in GMPLS networks).*

(Continued)

*Primary Examiner* — Chi Pham
*Assistant Examiner* — Robert Lopata

(57) ABSTRACT

A method including receiving information corresponding to a network graph of a network; determining a maximum flow value of the network based on the network graph; selecting a value for a number of trap-free shortest link-disjoint paths to find between a source node and a destination node based on the maximum flow value; selecting a value for a minimum remaining flow value based on the value for the number of trap-free shortest link-disjoint paths; and selecting a trap-free shortest link-disjoint path in which a complementary part of the network supports at least the remaining minimum flow value.

22 Claims, 9 Drawing Sheets

(56) References Cited

OTHER PUBLICATIONS

Ajay, Todimala et al. (2004 Publication; An iterative heuristic for SRLG Diverse Routing in Mesh networks).*
Teresa, Gomes et al. (2010 Publication; Obtaining SRLG-Disjoint Path Pair of Min Cost).*
Hassan Naser et al. (2006 Publication; Link-Disjoint Shortest Delay Path Pair Computation Algorithms.).*
Taku Kihara et al. (2008 Publication; Fast Link-Disjoint Path Algorithm).*
Johnathan Whalen et al. (2007 Publication Finding Maximal Link Disjoint Paths in Multigraph).*
Eiji Oki et al. in publication titled: "Disjoint Path Selection Scheme with SRLG in GMPLS Networks". Published at High Performance Switching and Routing, 2002.*
Dimitri Bertsekas et al., "Data Networks," Prentice Hall, 2 pages, Second Edition, Saddle River, New Jersey, 07458.
D. Anthony Dunn et al., "Comparison of k-Shortest Paths and Maximum Flow Routing for Network Facility Restoration," Jan. 1994, 12 pages, IEEE Journal on Selected Areas in Communications, vol. 12, No. 1.
Martin German et al., "On the challenges of finding two link-disjoint lightpaths of minimun total weight across an optical network," Wavelength-Routed Optical Networks, Jun. 10-12, 2009, pp. 217-224, Valladolid, Spain.
Taku Kihara et al., "Fast Link-Disjoint Path Algorithm on Parallel Reconfigurable Processor DAPDNA-2," 2008, 5 pages, Department of Information and Computer Science, Faculty of Science and Technology, Japan.
Hyang-Won Lee et al., "Diverse Routing in Networks with Probabilistic Failures," Dec. 2010, 13 pages, vol. 18, No. 6, IEEE/ACM Transactions on Networking.
M. H. Macgregor, "Optimized k-shortest-paths Algorithm for Facility Restoration," Software-Practice and Experience, Sep. 1994, pp. 823-834, vol. 24(9), John Wiley & Sons, Ltd. Canada.
Hassan Naser et al., "Link-Disjoint Shortest-Delay Path-Pair Computation Algorithms for Shared Mesh Restoration Networks," Faculty of Engineering, Lakehead University, 2007, 6 pages, Ontario, Canada.
Justin P. Rohrer et al., "Path Diversification: A Multipath Resilience Mechanism," Information and Telecommunication Technology Center, The University of Kansas, 2009, pp. 343-351, 7th International Workshop on the Design of Reliable Communication Networks.
Qingya She, et al., "How Reliable Can Two-Path Protection Be?" Jun. 2010, 12 pages, vol. 18, No. 3, IEEE/ACM Transactions on Networking.
J.W. Suurballe, "Disjoint Paths in a Network," Bell Telephone Laboratories, Inc., 1974, pp. 125-145, John Wiley & Sons, Inc., Holmdel, New Jersey.
J.W. Suurballe et al., "A Quick Method for Finding Shortest Pairs of Disjoint Paths," Networks, 1984, vol. 14, pp. 325-336, John Wiley & Sons, Inc.
Ying Xiao et al., "Constrained Shortest Link-Disjoint Paths Selection: A Network Programming Based Approach," IEEE Transactions on Circuits and Systems, May 2006, vol. 53, No. 5.
Dahai Xu, et al., "On Finding Disjoint Paths in Single and Dual Link Cost Networks*," Department of Computer Science and Engineering, State University of New York at Buffalo, 2004, pp. 705-715, IEEE 2004.
Dahai Xu et al., "On the Complexity of and Algorithms for Finding the Shortest Path with a Disjoint Counterpart," IEEE/ACM Transitions on Networking, Feb. 2006, pp. 147-158, vol. 14, No. 1, IEEE.
Peng Zhang et al., "On the Complexity and Approximation of the Min-Sum and Min-Max Disjoint Paths Problems," Escape, 2007, pp. 70-81, Springer-Verlag Berlin Heidelberg.

* cited by examiner

| $i$ | $D_{S,T}^h(i,2)$ | $\mathbf{P}_{S,T}^h(i,2)$ | $D_{S,T}^h(i,2)$ | $\mathbf{P}_{S,T}^h(i,2)$ |
|---|---|---|---|---|
| | h=1 | | h=2 | |
| S | 0 | | 0 | |
| A | 1 | S-A | 1 | S-A |
| B | ∞ | | 1.01 | S-C-B |
| E | ∞ | | ∞ | |
| C | 1 | S-C | 1 | S-C |
| F | ∞ | | 1.1 | S-C-F |
| G | ∞ | | 5 | S-D-G |
| D | 4 | S-D | 4 | S-D |
| T | ∞ | | 5 | S-D-T |

Fig. 4B

| | h=3 | | h=4 | |
|---|---|---|---|---|
| $i$ | $D_{S,T}^h(i,2)$ | $\mathbf{P}_{S,T}^h(i,2)$ | $D_{S,T}^h(i,2)$ | $\mathbf{P}_{S,T}^h(i,2)$ |
| S | 0 | | 0 | |
| A | 1 | S-A | 1 | S-A |
| B | 1.01 | S-C-B | 1.01 | S-C-B |
| E | 1.11 | S-C-F-E | 1.11 | S-C-F-E |
| C | 1 | S-C | 1 | S-C |
| F | 1.1 | S-C-F | 1.1 | S-C-F |
| G | 2.1 | S-C-F-G | 2.1 | S-C-F-G |
| D | 4 | S-D | 3.1 | S-C-F-G-D |
| T | 5 | S-D-T | 5 | S-D-T |

Fig. 4C

| i | $D_{S,T}^h(i,2)$ | $\mathbf{P}_{S,T}^h(i,2)$ |
|---|---|---|
| S | 0 | |
| A | 1 | S-A |
| B | 1.01 | S-C-B |
| E | 1.11 | S-C-F-E |
| C | 1 | S-C |
| F | 1.1 | S-C-F |
| G | 2.1 | S-C-F-G |
| D | 3.1 | S-C-F-G-D |
| T | 5 | S-D-T | h=5

Fig. 4D

TRAP-FREE SHORTEST LINK-DISJOINT PATHS

BACKGROUND

As network operators and service providers strive to provide new or improved services and/or assets to users, network requirements may correspondingly increase. As a result, network operators and service providers must confront a host of challenges to ensure that quality of service (QOS) and other performance metrics are maintained. For example, one important challenge confronted by network operators and service providers is to ensure that service is not degraded or minimally degraded due to failures in the network.

BRIEF DESCRIPTION OF THE DRAWINGS

FIGS. 4B-4D are diagrams illustrating exemplary tables that include the shortest distances $D_{s,t}^{h}(i,f)$ and the shortest paths $P_{s,t}^{h}(i,f)$.

DETAILED DESCRIPTION OF PREFERRED EMBODIMENTS

Figure 1:
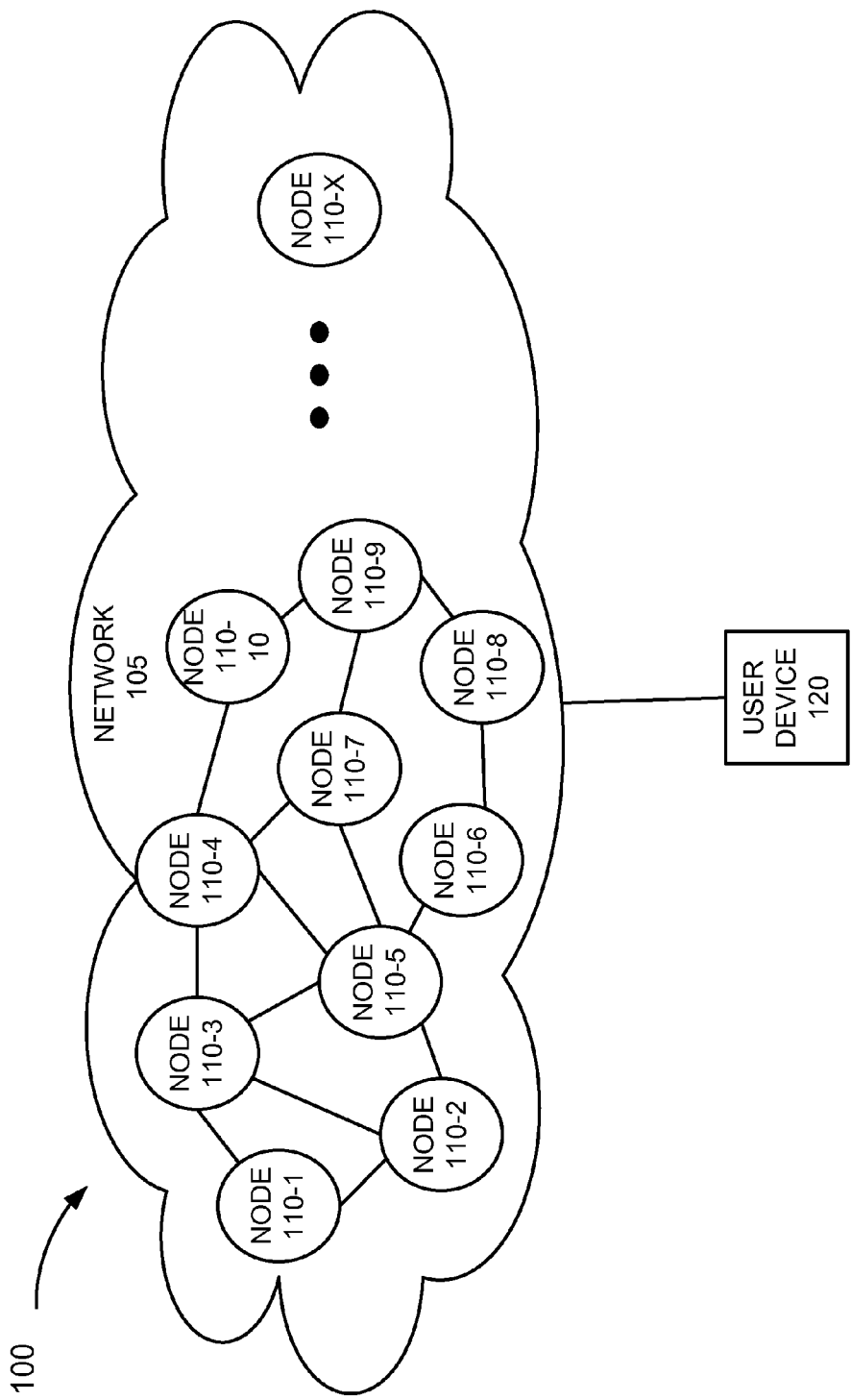
FIG. 1 is a diagram illustrating an exemplary environment in which an exemplary embodiment for determining and using trap-free K shortest link-disjoint paths may be implemented.

The following detailed description refers to the accompanying drawings. The same reference numbers in different drawings may identify the same or similar elements. Also, the following detailed description does not limit the invention.

Link and node failures may occur unexpectedly in a network and there are numerous techniques to manage these issues. One approach to attain fast restoration is to provision network connections over rings. This protection architecture can provide two physical link-disjoint paths that may protect the delivery of service when any single node failure or single link failure occurs. However, for some customers, this level of protection may not be sufficient.

Another approach is to protect an end-to-end path with one or more link-disjoint protection paths. With K link-disjoint paths in total, an end-to-end path can survive any combination of K−1 or fewer link failures. For ultra-high availability service, a network may be provisioned, for example, with K=3, K=4, or K=5. However, existing approaches for selecting link-disjoint paths can fail due to traps. A trap problem occurs when the nodes and links associated with a shortest path may form a cut (i.e., a source to termination cut) within the network that precludes the finding of other shortest link-disjoint paths from the source node to the termination node (i.e., destination node).

According to an exemplary embodiment, a trap-free shortest link-disjoint algorithm for determining K shortest link-disjoint paths from a source node s to a termination node t without encountering a trap problem is described. According to an exemplary embodiment, the value of K must be less than or equal to the maximum flow from source node s to a termination node t. The maximum flow may be determined using conventional algorithms (e.g., Ford-Fulkerson algorithm, etc.). By way of example, when selecting a first shortest link-disjoint path from node s to node t, the first shortest link-disjoint path must allow for a remaining flow of at least K−1 units in the complementary part of the network. Similarly, when selecting a second shortest link-disjoint path from node s to node t, the second shortest link-disjoint path must allow for a remaining flow of at least K−2 units in the complementary part of the network. According to an exemplary embodiment, a generalized Bellman dynamic programming equation may be used to determine whether the complementary part of the network has an appropriate flow for any given candidate shortest link-disjoint path.

The term "network," as used herein, is intended to be broadly interpreted to include a wireless network and/or a wired network. The network may have, for example, a mesh topology, a star topology, a fully-connected topology, or some other type of topology. The term "node," as used herein, is intended to be broadly interpreted to include a network device having routing or switching capability. For example, the node may correspond to a router, a switch, a bridge, a gateway, etc.

The term "path," as used herein, is intended to be broadly interpreted to include a physical path and/or a logical path. For example, a link-disjoint path may correspond to an Internet Protocol (IP) path, a Multi-Protocol Label Switching (MPLS) path, a light (i.e., optical) path, a virtual circuit path, or any combination thereof. The path may correspond to an end-to-end path (e.g., from a source node to a termination node).

FIG. 1 is a diagram illustrating an exemplary environment 100 in which an exemplary embodiment for determining and using trap-free K shortest link-disjoint paths may be implemented. As illustrated in FIG. 1, exemplary environment 100 may include a network 105 that includes nodes 110-1 through 110-X (referred to as nodes 110 or node 110), and user device 120.

The number of devices and configuration in environment 100 is exemplary and provided for simplicity. According to other embodiments, environment 100 may include additional devices, fewer devices, different devices, and/or differently arranged devices than those illustrated in FIG. 1. Environment 100 may include wired and/or wireless connections among the devices illustrated.

Network 105 may include one or multiple networks of one or multiple types. Nodes 110 may include a network device having routing capability. User device 120 may include a computational device. For example, user device 120 may correspond to a computer or a server, which may reside inside or outside of network 105.

With reference to FIG. 1, according to an exemplary process, user device 120 may receive a network graph of network 105. The network graph may include topology information (e.g., nodes 110 and links) User device 120 may calculate trap-free K shortest link-disjoint paths for nodes 110 of network 105 based on a trap-free K shortest link-disjoint path algorithm described herein. User device 120 may output the trap-free shortest link-disjoint path results to a user, to another device, etc., as a file(s) and/or other informational structure. User device 120 or some other network management system (not illustrated) may provision nodes 110 according to the determined trap-free K shortest link-disjoint paths. For example, the nodes 110 may use one or more of the trap-free K shortest link-disjoint paths for providing service. The trap-free K shortest link-disjoint paths may be provisioned off-line or used in dynamic provisioning.

Figure 2:
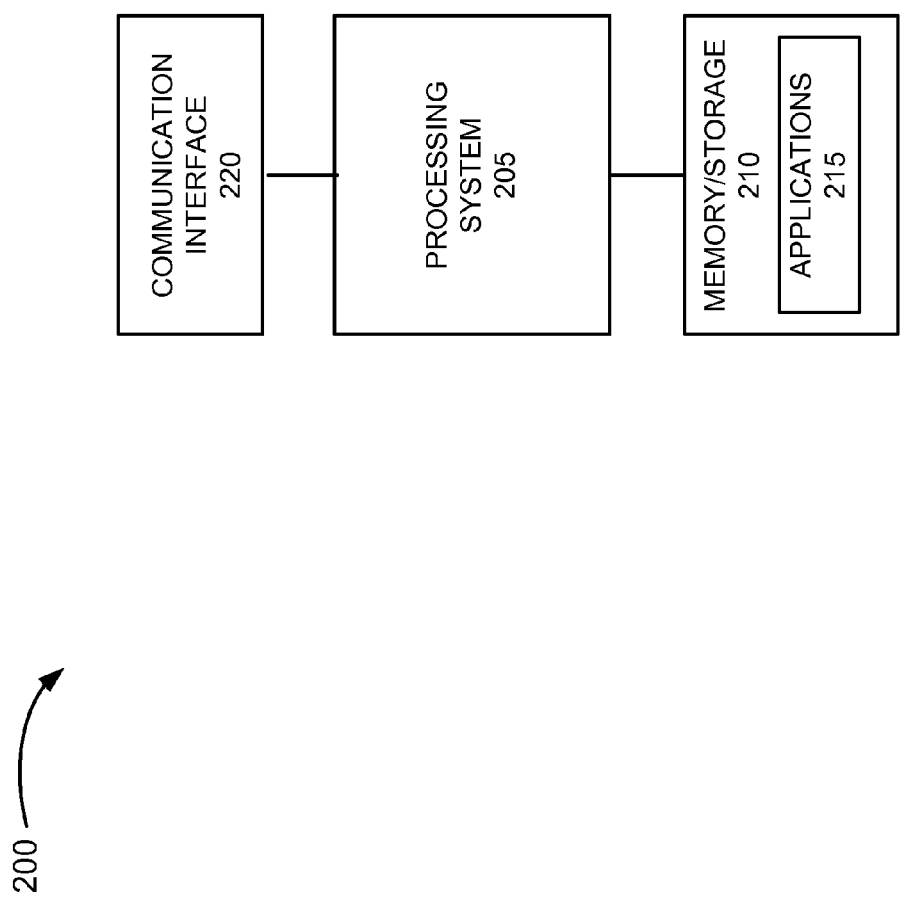
FIG. 2 is a diagram illustrating exemplary components of a device that may correspond to one or more devices in the exemplary environment depicted in FIG. 1.

FIG. 2 is a diagram illustrating exemplary components of a device 200 that may correspond to one or more of the devices in environment 100. For example, device 200 may correspond to node 110 and/or user device 120 depicted in FIG. 1. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein. For example, device 200 may include input components (e.g., a touchscreen, a keyboard, a keypad, a microphone, an input port, a mouse, a drive, etc.) and output components (e.g., a display, a speaker, an output port, a drive, etc.).

Processing system 205 may include one or multiple processors, microprocessors, data processors, co-processors, multi-core processors, application specific integrated circuits (ASICs), controllers, programmable logic devices, chipsets, field programmable gate arrays (FPGAs), system on chips (SoCs), microcontrollers, central processing units (CPUs), or some other component that may interpret and/or execute instructions and/or data. Depending on the type of processing system 205, processing system 205 may be implemented as hardware, or a combination of hardware and software, may include a memory (e.g., memory/storage 210), etc.

Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple other types of tangible storage mediums. For example, memory/storage 210 may include one or more types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) and a corresponding drive. Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray disk (BD), etc.). Memory/storage 210 may store data, application(s), and/or instructions related to the operation of device 200.

The term "computer-readable medium," as used herein, is intended to be broadly interpreted to include, for example, a memory, a CD, a DVD, a BD, or another type of tangible storage medium.

Applications 215 may include software that performs various services or functions. For example, with reference to node 110, applications 215 may include one or multiple applications pertaining to routing packets or other forms of network traffic. With reference to user device 120, applications 215 may include an application that, when executed, determines trap-free K shortest link-disjoint paths in a network (e.g., network 105), as described herein.

Communication interface 220 may permit device 200 to communicate with other devices, networks, systems and/or the like. Communication interface 220 may include one or multiple wireless interface(s) and/or wired interface(s). Communication interface 220 may include one or multiple transmitter(s) and receiver(s), or transceiver(s).

Device 200 may perform operation(s) and/or process(es) in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

As previously described, according to exemplary embodiments, K shortest link-disjoint paths from a source node s to a termination node t without encountering a trap problem may be determined. The trap-free K shortest link-disjoint paths may subsequently be provisioned in a network. A further description of an exemplary process is described further below.

A network graph may be defined as $G(N,L)$, where $N=\{1, \ldots, N\}$ and is the set of node labels, and $L=\{1, \ldots, L\}$ and is the set of link labels. $N=|N|$ is the number of nodes, and $L=|L|$ is the number of links. Each link is assumed to be bidirectional. The length of the link from node i to node j is denoted by $d(i,j)$. Since the links are bidirectional, it may be assumed that $d(i,j)=d(j,i)$. If there is no link between i and j, then $d(i,j)=\infty$. It may also be assumed that there is an imaginary self-looping link of zero length at each node i, i.e., $d(i,i)=0$. The label of the link from node i to node j is denoted by $e(i,j)$. If there is no link between nodes i and j, then $e(i,j)$ is equal to the empty set $\phi$. $P_{s,t}^{h}(i,f)$ may be defined as the set of links in the shortest h-hop path from node s to node i such that the flow from node s to node t is at least f units in the complementary part of the network $G(N, L-P_{s,t}^{h}(i,f))$. $D_{s,t}^{h}(i,f)$ may be defined as the total length of the set of h links in $P_{s,t}^{h}(i,f)$. The maximum flow from node s to node t in the network $G(N,L)$ can be denoted by $F_{s,t}^{MAX}(N,L)$.

According to the exemplary expressions below, trap-free K shortest link-disjoint paths may be determined:

---

For $1 \leq k \leq K$, find the $k^{th}$ link-disjoint path from s to t
{
   Set required minimum remaining flow: $f = K - k$.
   Initialize $D_{s,t}^{0}(j, f) = \infty$, for $1 \leq j \leq N, j \neq s$, and 0 if $j = s$.
   Set $h = 0$. Initialize $P_{s,t}^{0}(j, f) = \phi$, for $1 \leq j \leq N$.
   While $\{D_{s,t}^{h}(i, f) | 1 \leq i \leq N\}$ is not converged
   {
      increment number of hops: $h = h+1$
      For $1 \leq i \leq N$
      {
         Initialize $\delta(j) = 1$, for $1 \leq j \leq N$.
         While j* not found
         {
Find $j_{min}$ such that:
$d(j_{min}, i) + D_{s,t}^{h-1}(j_{min}, f) = \text{Min}\{d(j, i) + D_{s,t}^{h-1}(j, f) | 1 \leq j \leq N$,
$e(j, i) \neq \phi, \delta(j) = 1\}$, which may be expressed as:
        $D_{s,t}^{h+1}(i, f) =$
           $\text{Min}\{d(j,i) + D_{s,t}^{h}(j, f) |$
           $1 \leq j \leq N, F_{s,t}^{MAX}(N, L - e(i, j) - P_{s,t}^{h}(j, f)) \geq f\}$
           with $P_{s,t}^{h+1}(i, f) = e(j^*, i) \cup P_{s,t}^{h}(j^*, f)$,
        where j* is the node j, $1 \leq j \leq N$, for which $d(j,i) + D_{s,t}^{h}(j, f)$
        is minimum, such that the network $G(N, L - e(j^*, i) - P_{s,t}^{h}(j^*, f))$
        supports a flow of at least f units from node s to node t. The
        link from j* to node i, i.e., link $e(j^*, i)$, is on the shortest
        (h+1)-hop path from node s to node i, such that the
        complementary part of the network supports a flow of at -continued

```
       least f units from node s to node t.
       Mark the node j_min : δ(j_min) = 0
       Find β = F_{s,t}^{MAX}(N,L − e(j_min,i) − P_{s,t}^{h−1}(j_min, f)), where β is the
   maximum flow in G(N,L −e(j_min,i) − P_{s,t}^{h−1}(j_min, f))
       If β ≥ f {
               j* = j_min (i.e, j* has been found)
               D_{s,t}^h(i, f) = d(j*,i) + D_{s,t}^{h−1}(j*, f)
               P_{s,t}^h(i, f) = e(j*,i) ∪ P_{s,t}^{h−1}(j*, f)
               }
           }
       }
   }
       Output the k-shortest link-disjoint path P_{s,t}^h(t, f).
       Remove the links in P_{s,t}^h(t, f) from the network:
       L = L − P_{s,t}^h(t, f)
}.
```

Referring to the above expressions, the finding of $j_{min}$ such that $d(j_{min},i)+D_{s,t}^{h-1}(j_{min},f)=\text{Min}\{d(j,i)+D_{s,t}^{h-1}(j,f)|1\le j\le N, e(j,i)\ne\phi, \delta(j)=1\}$ provides that any links used for constructing a trap-free shortest link-disjoint path support the necessary flow for any successive trap-free shortest link-disjoint paths to be found. The above expressions may be used to find and select K-successive shortest link-disjoint paths from node s to node t in the network G(N,L), assuming $K\div F_{s,t}^{MAX}(N,L)$. The (integer) value of the maximum flow, expressed as $F_{s,t}^{MAX}(N,L)$, may be ascertained by applying the Ford-Fulkerson Maximum Flow algorithm, or some other appropriate algorithm, to network G(N,L), in which the capacity of all links may be set to unity. Additionally, before using the trap-free K shortest link-disjoint path algorithm described herein, it is assumed that $K\le F_{s,t}^{MAX}(N,L)$. If this is not the case, then a smaller value of K must be chosen for the node pair (s, t). In the above expressions, when determining the flow β, these calculations may be terminated once it has been determined that the flow is at least equal to f. In other words, these calculations may be terminated once a flow of f has been 'pushed' through the complementary network.

Figure 3:
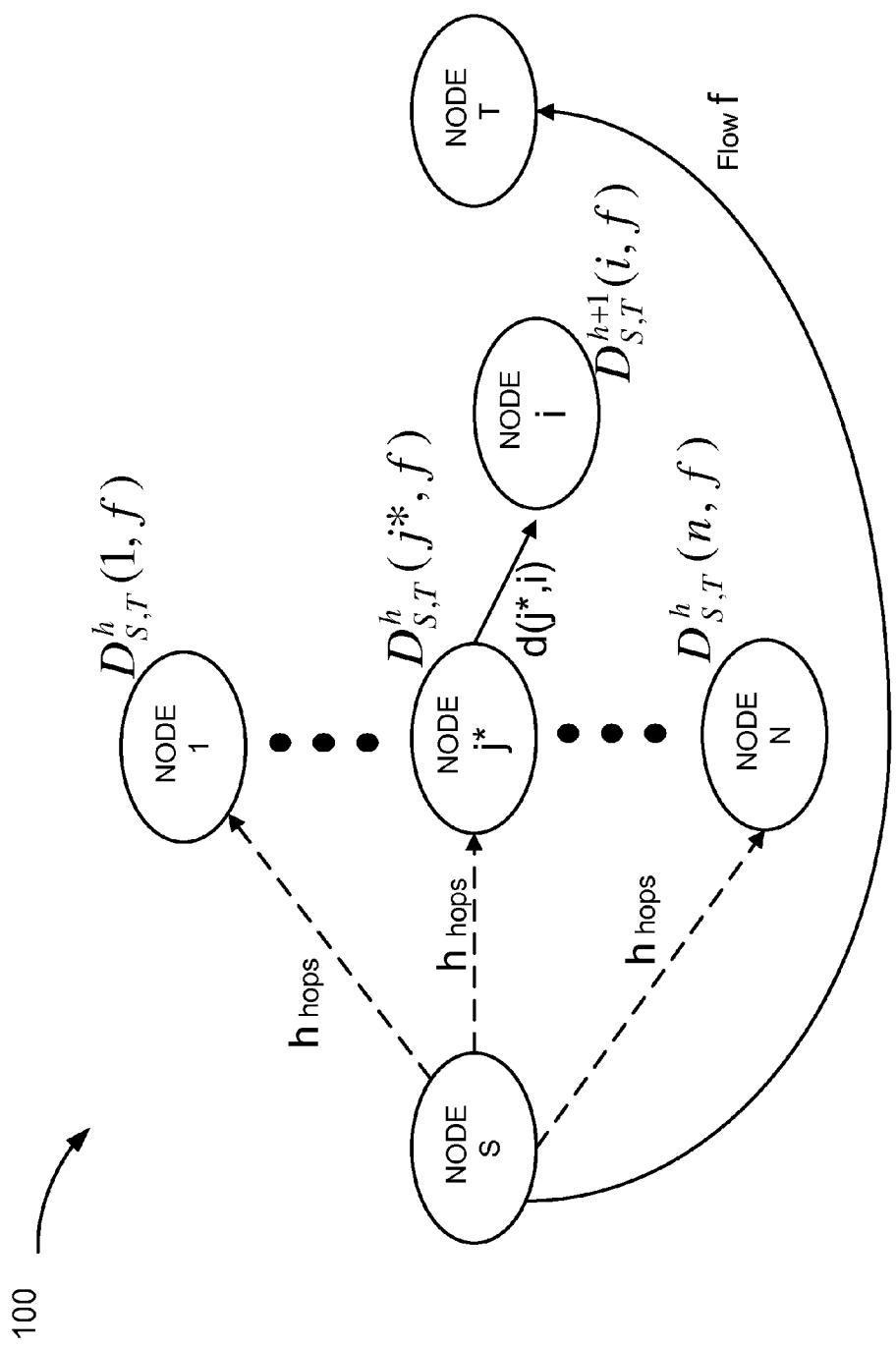
FIG. 3 is a diagram that illustrates a choice of node j*.

As previously described, j* is the node j, $1\le j\le N$, for which $d(j,i)+D_{s,t}^h(j,f)$ is minimum, such that the network G(N,L−e(j*,i)−$P_{s,t}^h$(j*,f)) supports a flow of at least f units from node s to node t. FIG. 3 is a diagram that illustrates a choice of node j* and link e(j*,i). According to this example, node j* is the optimal choice along a shortest link-disjoint path to node t. The link e(j*,i) having a length of d(j*,i) is also shown. In some cases, the link e(j*,i) may be a self-looping link, in which case j*=i and d(j*,i)=0. Also, as expressed above, $\{D_{s,t}^h(i,f)|1\le i\le N\}$ must converge before $D_{s,t}^h(i,f)$ is to be considered the length of the shortest link-disjoint path from node S to node T. Described below is an exemplary application of the trap-free K shortest link-disjoint path algorithm to a network.

Figure 4A:
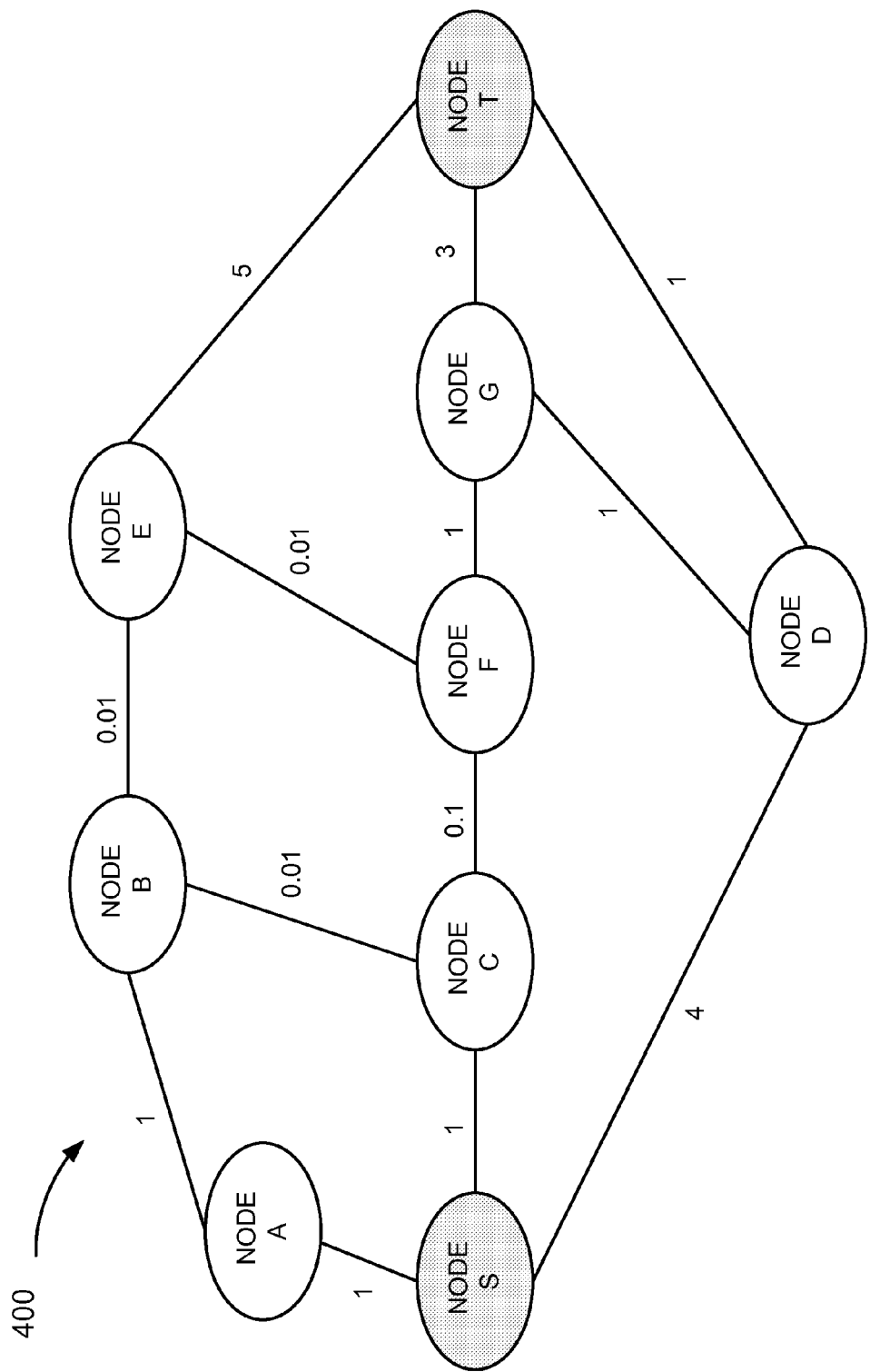
FIG. 4A is a diagram illustrating an exemplary network.

FIG. 4A is a diagram illustrating an exemplary network 400. As illustrated, network 400 includes node S and node T, as well as other intermediary nodes A-G. Each link is assigned an exemplary link distance (e.g., 0.01, 0.1, 1, 3, 4, 5). In this example, it may be assumed that the problem is to find three (3) shortest link-disjoint paths from node S to node T. By inspection, network 400 provides at least a maximum flow of 3 units from node S to node T. If the path S-C-B-E-F-G-D-T is selected as the shortest link-disjoint path, such a path does not allow for a remaining flow of at least 2 units (i.e., K−1). In fact, in this particular case, the selection of such a path does not allow for any remaining flows since the links in the path S-C-B-E-F-G-D-T form an S-T cut in network 400. That is, removing the links in the path of nodes C, B, and D, prevent any remaining disjoint path from node S to T to exist and correspondingly any remaining flow.

In contrast to the above, when applying the trap-free K shortest link-disjoint path process described herein, the result is different. FIGS. 4B-4D are diagrams illustrating exemplary tables that include the shortest distances $D_{S,T}^h(i,f)$ and the shortest paths $P_{S,T}^h(i,f)$ when calculated for 1 hop to 5 hops from node S. Referring to 4B, and under the heading h=1 in the Table, f=2=K−1 for $D_{S,T}^h(i,f)$ and $P_{S,T}^h(i,f)$. For under column i, the shortest distance from node S to node S equals 0 and the shortest distance from node S to node A equals 1. However, the shortest distance from node S to node B is infinite because, as illustrated in FIG. 4A, it is not possible to reach node B from node S in one hop. The remaining nodes of network 400 are also considered, as illustrated in FIG. 4B, which may be interpreted in a similar manner. Under the path column $P_{S,T}^h(i,f)$, the path is indicated in terms of nodes. For example, the one hop path from node S to node A is illustrated in the Table as S-A. In a similar manner, when h=2, the shortest distance and paths may be calculated. Referring to FIGS. 4C and 4D, the shortest distances and paths may be calculated. As illustrated in FIG. 4C, the values under the columns $D_{S,T}^h(i,f)$ when h=3 and h=4 are nearly identical, except for node D, as indicated by the shaded field in the Table. That is, when h=3, $D_{S,T}^h(i,f)$=4, and when h=4, $D_{S,T}^h(i,f)$=3.1. However, when referring to FIG. 4C and FIG. 4D, when h=4 and h=5, the values under the columns $D_{S,T}^h(i,f)$ are identical. This represents, as previously discussed above, a convergence (i.e., $\{D_{s,t}^h(i,f)|1\le i\le N\}$ must converge before $D_{s,t}^h(i,f)$ is to be considered the length of the shortest link-disjoint path from node s to node t). In this example, the path S-D-T is the first trap-free shortest link-disjoint path.

For the case when K=2, the trap-free shortest link-disjoint path algorithm may be applied to the MIN-MIN approach, which tries to minimize the shortest path length in a pair of disjoint paths. In accordance with the MIN-MIN approach, shortest paths are selected for a pair of nodes (s, t) using Dijkstra's algorithm or other shortest path algorithms. However, the MIN-MIN approach is susceptible to traps. For example, after having selected a first shortest link-disjoint path, a second shortest link-disjoint path may not be found. However, when applying the trap-free shortest link-disjoint path algorithm, the trap problem may be avoided.

The trap-free shortest link-disjoint path algorithm may also be applied to the MAX-REL approach, which tries to maximize the reliability of a pair of disjoint paths based on link weights that are specified in terms of link failure probabilities. Two heuristic algorithms for MAX-REL have been developed; the Two-Step Reliability Algorithm (TRA) and the Maximum Reliability Algorithm (MRA). According to the TRA, the cost of link i is given by the transformation $\log_q^{q_i}$, in which q is a constant such that 0<q<1 and (1−$q_i$) is the link failure probability. However, the TRA will fail when it encounters a trap. According to an exemplary embodiment, the trap-free shortest link-disjoint path algorithm may include the TRA heuristic when, for example, K=2, without encountering any trap problem. For example, when applied to the transformed network, it must be verified that a flow of 2 units can be supported between node s and node t. Then, the first shortest link-disjoint path may be found such that the remaining flow of at least 1 unit in the complementary network (i.e., that portion of the network, which excludes the first shortest link-disjoint path) is present. Next, the links of the first shortest link-disjoint path may be removed from the transformed network and the second shortest link-disjoint path may be found.

In addition, the trap-free shortest link-disjoint algorithm may include the TRA heuristic for values of K greater than 2 by calculating additional iterations. For example, when applied to the transformed network it must be verified that a flow of K units can be supported between node s and node t. Thereafter, the process is very similar to that discussed above, in which a trap-free shortest link-disjoint path is found such that the remaining flow in the complementary network is present. So, for example, for the first trap-free shortest link-disjoint path, K−1 units in the complementary network may be needed; for the second trap-free shortest link-disjoint path, K−2 units in the complementary network may be needed; for the third trap-free shortest link-disjoint path, K−3 units in the complementary network may be needed, etc.

The trap-free shortest link-disjoint path algorithm may also be used to form new heuristics for solving generalized MAX-REL path problems, which may include a combination of the trap-free algorithm and TRA or MRA. By way of example, one heuristic may be to use the trap-free algorithm to first find the shortest distance path such that there is a remaining possible flow of at least K−1 units in the complimentary part of the network, and then use the extended TRA heuristic with the trap-free algorithm to find a set of K−1 shortest link-disjoint MAX-REL paths. Alternatively, MRA may also be used to find a set of K−1 MAX-REL paths. The generalized MAX-REL heuristic may provide a first path with shortest physical length, which may be desirable for delay and cost reasons, and the remaining K−1 paths may then provide reliability protection in the event of network failures. Additional heuristic variations for generalized MAX-REL path problems can also be defined. For example, the trap-free algorithm may be used to find the first and the second shortest distance paths such that there is a remaining possible flow of at least K−2 units in the complementary part of the network, and then use the MRA heuristic or the extended TRA heuristic with the trap-free algorithm to find the set of K−2 MAX-REL paths.

Figure 5A:
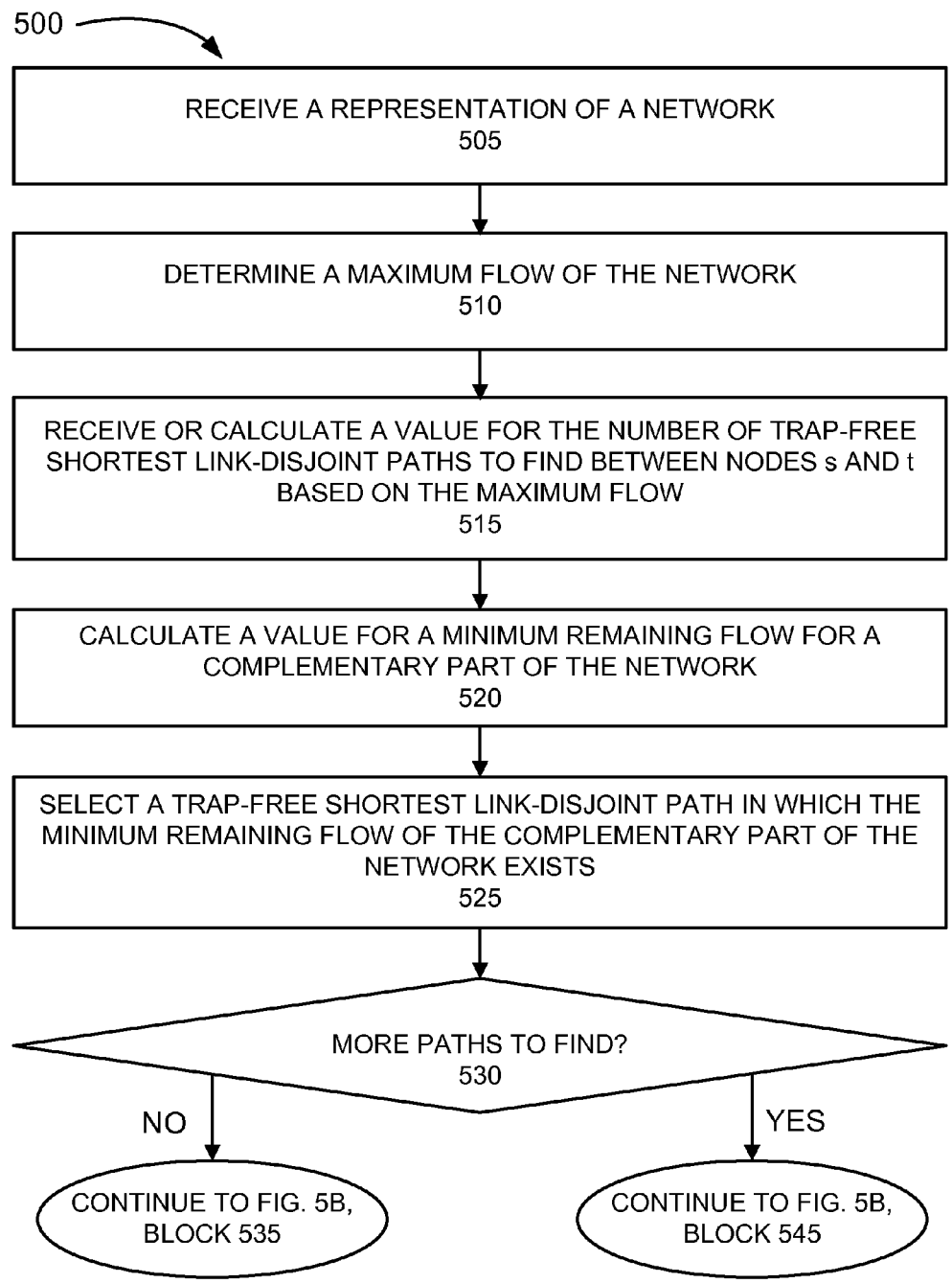
FIGS. 5A and 5B are flowcharts illustrating an exemplary process for selecting trap-free K shortest link-disjoint paths and provisioning in a network.
Figure 5B:
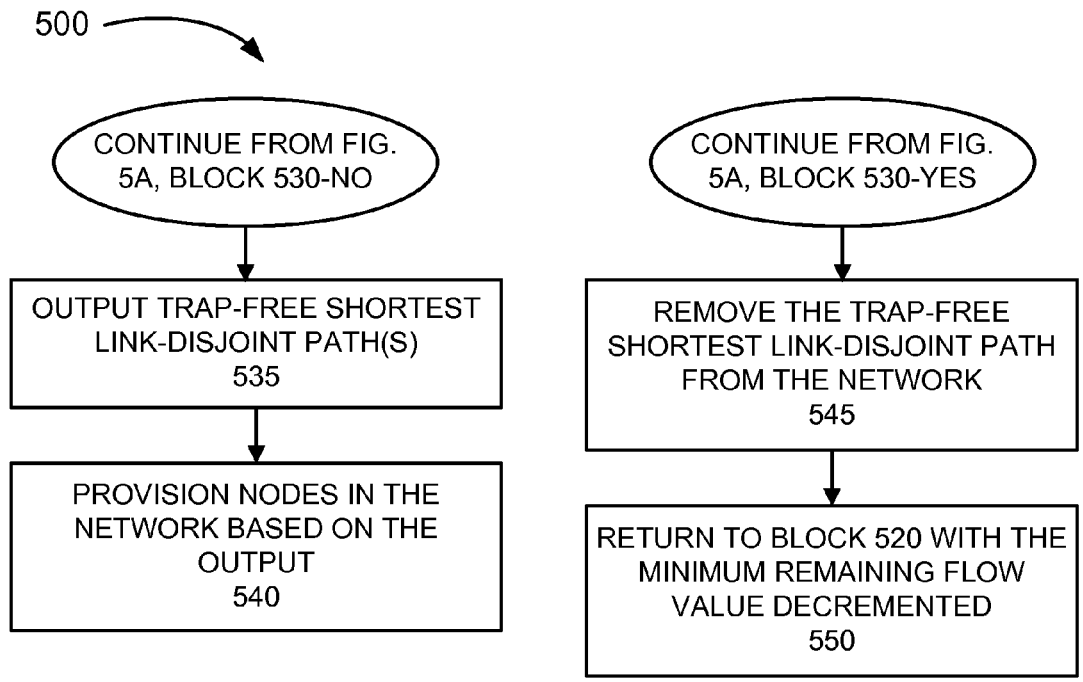

FIGS. 5A and 5B are flowcharts illustrating an exemplary process 500 for selecting K trap-free shortest link-disjoint paths and provisioning in a network. According to an exemplary embodiment, process 500 may be performed by user device 120.

Process 500 may include receiving a representation of a network (block 505). For example, as previously described, user device 120 may receive information pertaining to a network that includes links and nodes. By way of example, the information may take the form of a network graph or some other type of information representative of the network (e.g., network G(N,L)).

A maximum flow of the network may be determined (block 510). For example, as previously described, user device 120 may receive a value of the maximum flow, expressed as $F_{s,t}^{MAX}(N,L)$, may be ascertained by applying the Ford-Fulkerson Maximum Flow algorithm, or some other appropriate algorithm, to network G(N,L), in which the capacity of all links may be set to unity A value for the number of trap-free shortest link-disjoint paths to find between nodes s and t, which is based on the maximum flow, may be received or calculated (block 515). For example, as previously described, it may be assumed that $K \leq F_{s,t}^{MAX}(N,L)$ and K may represent the number of trap-free shortest link-disjoint paths to find. This value may be selected by a user (e.g., a network administrator) or may be automatically selected based on the maximum flow calculated.

A value for a minimum remaining flow for a complementary part of the network may be calculated (block 520). For example, as previously described, f=K−k. So, for example, for the first trap-free shortest link-disjoint path, f=K−1 units in the complementary network may be needed; for the second trap-free shortest link-disjoint path, f=K−2 units in the complementary network may be needed; for the third trap-free shortest link-disjoint path, f=K−3 units in the complementary network may be needed, etc.

A trap-free shortest link-disjoint path in which the minimum remaining flow of the complementary part of the network exists may be selected (block 525). For example, as previously described, until a convergence occurs (i.e., with respect to $\{D_{s,t}^{h}(i,f)|1 \leq i \leq N\}$) the number of hops h may be incremented to find $j_{min}$ and determine a trap-free shortest link-disjoint path from node s to node t.

It may be determined whether there are more paths to find (block 530). For example, as previously described, K may represent the number of trap-free shortest link-disjoint paths to find, which may decremented during each iteration of process 500.

If it is determined that there are no more paths to find (block 530-NO), the selected trap-free shortest link-disjoint path(s) may be output (block 535), as illustrated in FIG. 5B. For example, as previously described, user device 120 may output the trap-free shortest link-disjoint path results to a user, to another device, etc., as a file(s) and/or other informational structure.

The nodes in the network may be provisioned based on the output (block 540). For example, as previously described, user device 120 or some other network management system may provision nodes 110 according to the determined trap-free K shortest link-disjoint paths.

Referring back to FIG. 5A, if it is determined that there are more paths to find (block 530-YES), the trap-free shortest link-disjoint path may be removed from the network (block 545), as illustrated in FIG. 5B. For example, as previously described, the links in $P_{s,t}^{h}(t,f)$ from the network: $L=L-P_{s,t}^{h}(t,f)$ may be removed. Process 500 may continue by decrementing the minimum remaining flow value and returning to block 520 of FIG. 5A (block 550). For example, the minimum remaining flow f=K−k may be decreased and a selection of another trap-free shortest link-disjoint path may be performed.

Although FIGS. 5A and 5B illustrate an exemplary process 500 for selecting trap-free shortest link-disjoint paths and provisioning in a network, according to other implementations, process 500 may include additional operations, fewer operations, and/or different operations than those illustrated in FIGS. 5A and 5B and described herein. For example, as previously described, according to other embodiments, one or multiple heuristics may be applied to process 500.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the process illustrated in FIGS. 5A and 5B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
   receiving information corresponding to a network graph of a network;
   determining a maximum flow value of the network based on the network graph;
   selecting a value for a number of trap-free shortest link-disjoint paths to find between a source node and a destination node based on the maximum flow value;
   selecting a value for a minimum remaining flow value based on the value for the number of trap-free shortest link-disjoint paths; and
   selecting a trap-free shortest link-disjoint path in which a complementary part of the network supports at least the minimum remaining flow value.

2. The method of claim 1, further comprising:
   removing the trap-free shortest link-disjoint path from the network graph;
   decrementing the value for the number of trap-free shortest link-disjoint paths to find;
   decrementing the value for the minimum remaining flow value; and
   selecting another trap-free shortest link-disjoint path.

3. The method of claim 2, further comprising:
   recursively performing the removing, the decrementing the value for the number of trap-free shortest link-disjoint paths, the decrementing the value for the minimum remaining flow value, and the selecting another trap-free shortest link-disjoint path until the value for the number of trap-free shortest link-disjoint paths is reached.

4. The method of claim 1, further comprising:
   provisioning the selected trap-free shortest link-disjoint path in the network.

5. The method of claim 1, wherein the selecting the trap-free shortest link-disjoint path comprises:
   incrementing a number of hops from the source node to select an intermediate node along a candidate trap-free shortest link-disjoint path; and
   determining when a total length of a set of links in the candidate trap-free shortest link-disjoint path converges.

6. The method of claim 1, wherein the selecting the trap-free shortest link-disjoint path comprises:
   determining whether the complementary part of the network supports at least the minimum remaining flow value relative to a candidate trap-free shortest link-disjoint path from the source node to the destination node.

7. The method of claim 1, further comprising:
   applying a heuristic to links or paths in the network; and
   wherein the selecting the trap-free shortest link-disjoint path comprises:
   selecting the trap-free shortest link-disjoint path based on the heuristic.

8. The method of claim 1, wherein the selecting the trap-free shortest link-disjoint path comprises:
   selecting a candidate node associated with a partial candidate trap-free shortest link-disjoint path from the source node to the destination node; and
   determining whether the complementary part of the network supports at least the minimum remaining flow value.

9. A device comprising:
   a processing system; and
   a memory including instructions, which when executed, cause the processing system to:
   receive network topology information pertaining to a network;
   determine a maximum flow value of the network based on the network topology information;
   select a value for a number of trap-free link-disjoint paths to find between a source node and a destination node based on the maximum flow value;
   select a value for a minimum remaining flow value based on the value for the number of trap-free shortest link-disjoint paths; and
   select a trap-free shortest link-disjoint path in which a complementary part of the network supports at least the minimum remaining flow value.

10. The device of claim 9, wherein the processing system is further configured to:
    remove the trap-free shortest link-disjoint path from the network topology information;
    decrement the value for the number of trap-free shortest link-disjoint paths to find;
    decrement the value for the minimum remaining flow value; and
    select another trap-free shortest link-disjoint path.

11. The device of claim 10, wherein the processing system is further configured to:
    recursively perform to remove the trap-free shortest link-disjoint path from the network topology information, to decrement the value for the number of trap-free shortest link-disjoint paths, to decrement the value for the minimum remaining flow value, and to select another trap-free shortest link-disjoint path until the value for the number of trap-free shortest link-disjoint paths is reached.

12. The device of claim 11, wherein when selecting the trap-free shortest link-disjoint path, the processing system is further configured to:
    determine whether the complementary part of the network supports at least the minimum remaining flow value relative to a candidate trap-free shortest link-disjoint path from the source node to the destination node.

13. The device of claim 11, wherein the processing system is further configured to:

apply a heuristic to links or paths in the network; and
wherein when selecting the trap-free shortest link-disjoint path, the device is further configured to:
select the trap-free shortest link-disjoint path based on the heuristic.

14. The device of claim 11, wherein when selecting the trap-free shortest link-disjoint path, the device is further configured to:
select a candidate node associated with a partial candidate trap-free shortest link-disjoint path from the source node to the destination node; and
determine whether the complementary part of the network supports at least the minimum remaining flow value.

15. The device of claim 11, wherein the network is a mesh network.

16. A non-transitory computer-readable medium comprising instructions executable by a processor of a computational device for:
receiving network topology information of a network;
determining a maximum flow value of the network based on the network topology information;
selecting a value for a minimum remaining flow value;
selecting a source node and a destination node in which to find one or more trap-free shortest link-disjoint paths; and
selecting one or more trap-free shortest link-disjoint paths from the source node to the destination node in which a complementary part of the network supports at least the minimum remaining flow value with respect to each selected trap-free shortest link-disjoint path.

17. The non-transitory computer-readable medium of claim 16, wherein the instructions for selecting the one or more trap-free shortest link-disjoint paths comprises further instructions for:
determining whether the complementary part of the network supports at least the minimum remaining flow value relative to a candidate trap-free shortest link-disjoint path from the source node to the destination node.

18. The non-transitory computer-readable medium of claim 16, wherein the instructions for selecting the one or more trap-free shortest link-disjoint paths comprises further instructions for:
incrementing a number of hops from the source node to select an intermediate node along a candidate trap-free shortest link-disjoint path; and
determining when a total length of a set of links in the candidate trap-free shortest link-disjoint path converges.

19. The non-transitory computer-readable medium of claim 16, wherein the instructions for selecting the one or more trap-free shortest link-disjoint paths comprises further instructions for:
decrementing the value for the minimum remaining flow value as each trap-free shortest link-disjoint path is selected.

20. The non-transitory computer-readable medium of claim 16, comprising further instructions for:
applying a heuristic to links or paths in the network; and
selecting the one or more trap-free shortest link-disjoint paths based on the heuristic.

21. A method comprising:
receiving information corresponding to a network graph of a network;
determining a maximum flow value of the network based on the network graph;
selecting a value for a number of trap-free shortest link-disjoint paths to find between a source node and a destination node based on the maximum flow value;
selecting a value for a minimum remaining flow value based on the value for the number of trap-free shortest link-disjoint paths; and
selecting a trap-free shortest link-disjoint path in which a complementary part of the network supports at least the minimum remaining flow value, wherein the selecting the trap-free shortest link-disjoint path comprises:
determining whether the complementary part of the network supports at least the minimum remaining flow value relative to a candidate trap-free shortest link-disjoint path from the source node to the destination node.

22. A non-transitory computer-readable medium comprising instructions executable by a processor of a computational device for:
receiving network topology information of a network;
determining a maximum flow value of the network based on the network topology information;
selecting a value for a minimum remaining flow value;
selecting a source node and a destination node in which to find one or more trap-free shortest link-disjoint paths; and
selecting one or more trap-free shortest link-disjoint paths from the source node to the destination node in which a complementary part of the network supports at least the minimum remaining flow value with respect to each selected trap-free shortest link-disjoint path wherein the instructions for selecting the one or more trap-free shortest link-disjoint paths comprises further instructions for:
determining whether the complementary part of the network supports at least the minimum remaining flow value relative to a candidate trap-free shortest link-disjoint path from the source node to the destination node.

* * * * *